(12) United States Patent
Kaplan et al.

(10) Patent No.: US 7,414,773 B2
(45) Date of Patent: Aug. 19, 2008

(54) DEVICE FOR DISPERSING LIGHT PULSES OF WHICH THE SPECTRAL AMPLITUDE IS PROGRAMMABLE

(75) Inventors: Daniel Kaplan, Paris (FR); Pierre Tournois, Cagnes S/Mer (FR)

(73) Assignee: Fastlite, Paris (FR)

( * ) Notice: Subject to any disclaimer, the term of this patent is extended or adjusted under 35 U.S.C. 154(b) by 0 days.

(21) Appl. No.: 11/590,929

(22) Filed: Nov. 1, 2006

(65) Prior Publication Data

US 2007/0103778 A1    May 10, 2007

(30) Foreign Application Priority Data

Nov. 3, 2005    (FR)    .................... 05 11185

(51) Int. Cl.
*G02F 1/11*    (2006.01)
*G02F 1/33*    (2006.01)
*G02B 26/00*    (2006.01)

(52) U.S. Cl. ................ 359/285; 359/290; 359/305

(58) Field of Classification Search ............. 359/285, 359/290, 291, 308–314
See application file for complete search history.

(56) References Cited

U.S. PATENT DOCUMENTS 4,652,817 A * 3/1987 Yarborough et al. ..... 324/76.37

4,685,772 A    8/1987    Chang
5,463,493 A *  10/1995   Shah ........................ 359/312
6,771,412 B2 * 8/2004    Torchigin ................. 359/305

FOREIGN PATENT DOCUMENTS

FR    2 852 155 A1    9/2004

OTHER PUBLICATIONS

R.L. Fork et al., "Negative Dispersion Using Pairs Prisms", Optical Letters, OSA, Optical Society of America, Washington, DC, US vol. 9, No. 5, May 1984, pp. 150-152.
D. Parsons-Karavassilis et al., "Diode-Pumped All-Solid-State Ultrafast CR:LISGAF Laser Oscillator-Amplifier Applied to Laser Ablation", Optics Communications, North-Holland Publishing Co., Amsterdam, Netherlands, vol. 175, No. 4-6, Mar. 2000, pp. 389-396.

* cited by examiner

*Primary Examiner*—Mohammed Hasan
(74) *Attorney, Agent, or Firm*—Browdy and Neimark

(57) ABSTRACT

Device for dispersion of light pulses of an optical beam constituted by two dispersive prisms with the same vertex angle, mounted head to tail, the optical input surface of the first prism being parallel to the optical output surface of the second prism, the distance separating the optical input surface of the first prism and the optical output surface of the second prism being adjustable, given that the material constituting at least one of the first and second prisms is an acousto-optic material allowing for acousto-optic interaction between the optical beam and an acoustic beam, the acoustic wave of the acoustic beam generating, in at least one of the first and second prisms, an integrated deflective Bragg cell.

5 Claims, 6 Drawing Sheets

DEVICE FOR DISPERSING LIGHT PULSES OF WHICH THE SPECTRAL AMPLITUDE IS PROGRAMMABLE

BACKGROUND OF THE INVENTION

1. Field of the Invention

This invention relates to a device for dispersion of light pulses programmable in spectral amplitude.

2. Description of the Prior Art

In general, it is known that there are numerous devices for dispersing brief light pulses. One of them, proposed for the first time by R. L. Fork et al, "Negative dispersion using pairs of prisms", published in Optics Letters, May 1984, consists of using a train of two identical reversed prisms (the input surface of the first prism is parallel to the output surface of the second prism).

In the example shown in FIG. 1, describing the prior art relating in particular to the device cited above, two prisms $P_1$, $P_2$, having the same vertex angle $\alpha$, are arranged head to tail, the input surface of said prism $P_1$ is parallel to the output surface of said prism $P_2$, the distance separating them being L; the output surface of said first prism $P_1$ is consequently parallel to the input surface of said prism $P_2$, the distance separating them being d; the projection of the vertex of said prism $P_2$ on the input surface of said prism $P_1$ is separated by H from the vertex of said prism $P_1$.

The modification of the dispersion characteristic associating the delay time with the optical wavelength is performed by modifying the distance L that separates the input and output surfaces of the prisms $P_1$, $P_2$; the modification of the dispersion characteristic can also be performed by modifying the distance H that separates the vertices of the two prisms $P_1$, $P_2$.

SUMMARY OF THE INVENTION

It appears that all of these devices for dispersing brief light pulses do not make it possible to modify, over time, the relative amplitude of the various wavelengths of said light pulses.

The invention is therefore intended more specifically to overcome this disadvantage. It proposes a device for dispersing light pulses of an optical beam constituted by two dispersive prisms, with the same vertex angle, mounted head to tail, the optical input surface of the first prism being parallel to the optical output surface of the second prism, the distance separating said optical input surface of the first prism and said optical output surface of the second prism being adjustable, given that the material constituting at least one of said first and second prisms is an acousto-optic material allowing for acousto-optic interaction between said optical beam and an acoustic beam, the acoustic wave of said acoustic beam generating, in at least one of said first and second prisms, an integrated deflecting Bragg cell. In such a device, the various optical wavelengths have been spatially separated from one another transversely by the dispersion of the prisms.

The acousto-optic Bragg cell, of which the axis is almost perpendicular to the light rays, diffracts, selectively in amplitude, the various optical wavelengths according to the signals applied to the transducer of said Bragg cell.

The diffracted waves are eliminated from the device according to the invention; only the non-diffracted waves, of which the amplitude according to the optical wavelength has been made programmable by the acousto-optic interaction, are involved in the dispersion device.

Advantageously, the incident optical beam is perpendicular or almost perpendicular to the input and output surfaces, respectively, of said first and second prisms, and is polarised perpendicularly to the edges of the prisms.

In addition, the vertex angle of said first and second prisms is such that the light radiation of said optical beam corresponds to a wavelength at the centre of the spectrum, i.e. under the Brewster incidence relative to the input and output surfaces, respectively, of said first and second prisms.

Advantageously, the material constituting at least one of said first and second prisms is a tellurium dioxide crystal ($TeO_2$)-type acousto-optic material of which the surface associated with a piezoelectric transducer Ta forms an angle of less than 15 degrees with the optical axis [001] of said tellurium dioxide crystal ($TeO_2$).

In addition, said piezoelectric transducer Ta generates an acoustic wave of which the amplitude and/or the frequency are programmed as a function of time; the signals applied to said piezoelectric transducer Ta are provided by a generator, associated with a calculator that displays the amplitude and frequency parameters desired as a function of time.

BRIEF DESCRIPTION OF THE DRAWINGS

An embodiment of the invention is described below, by way of a non-limiting example, with reference to the appended drawings, in which.

DESCRIPTION OF THE PREFERRED EMBODIMENTS

Figure 1:
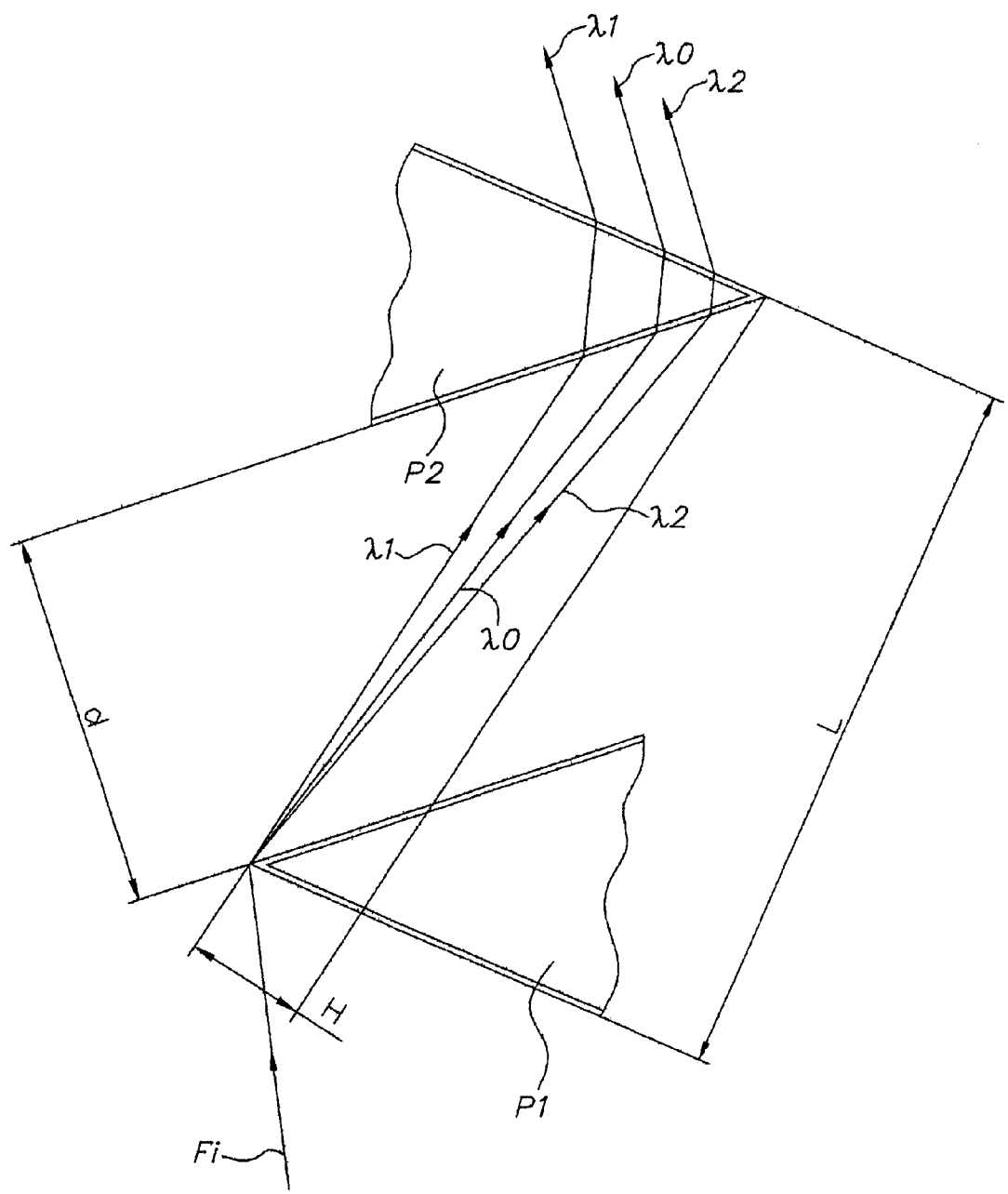
FIG. 1 is a diagrammatic representation of a device according to the prior art.

In the example shown in FIG. 1, two prisms $P_1$, $P_2$, with the same vertex angle $\alpha$, are arranged head to tail, the input surface of said prism $P_1$ is parallel to the output surface of said prism $P_2$, the distance separating them being L; the output surface of said first prism $P_1$ is consequently parallel to the input surface of said prism $P_2$, the distance separating them being d; the projection of the vertex of said prism $P_2$ on the input surface of said prism $P_1$ is separated by H from the vertex of said prism $P_1$.

An optical incident beam Fi is diffracted by the prism $P_1$, which resulting diffraction is represented by three optical paths having a wavelength $\lambda_1$, $\lambda_2$, on each side of a central wavelength $\lambda_0$, which paths are again diffracted in the second prism $P_2$; at the output of the second prism P2, the three optical paths having a wavelength $\lambda_0$, $\lambda_1$, $\lambda_2$, are spatially separated from one another and parallel to the incident beam Fi, the dispersion associating the delay time with the optical wavelength being dependent on the distance L and/or the distance H.

It should be noted that the variation in the delay time can be positive or negative depending on the geometric characteristics of the device.

Figure 2:
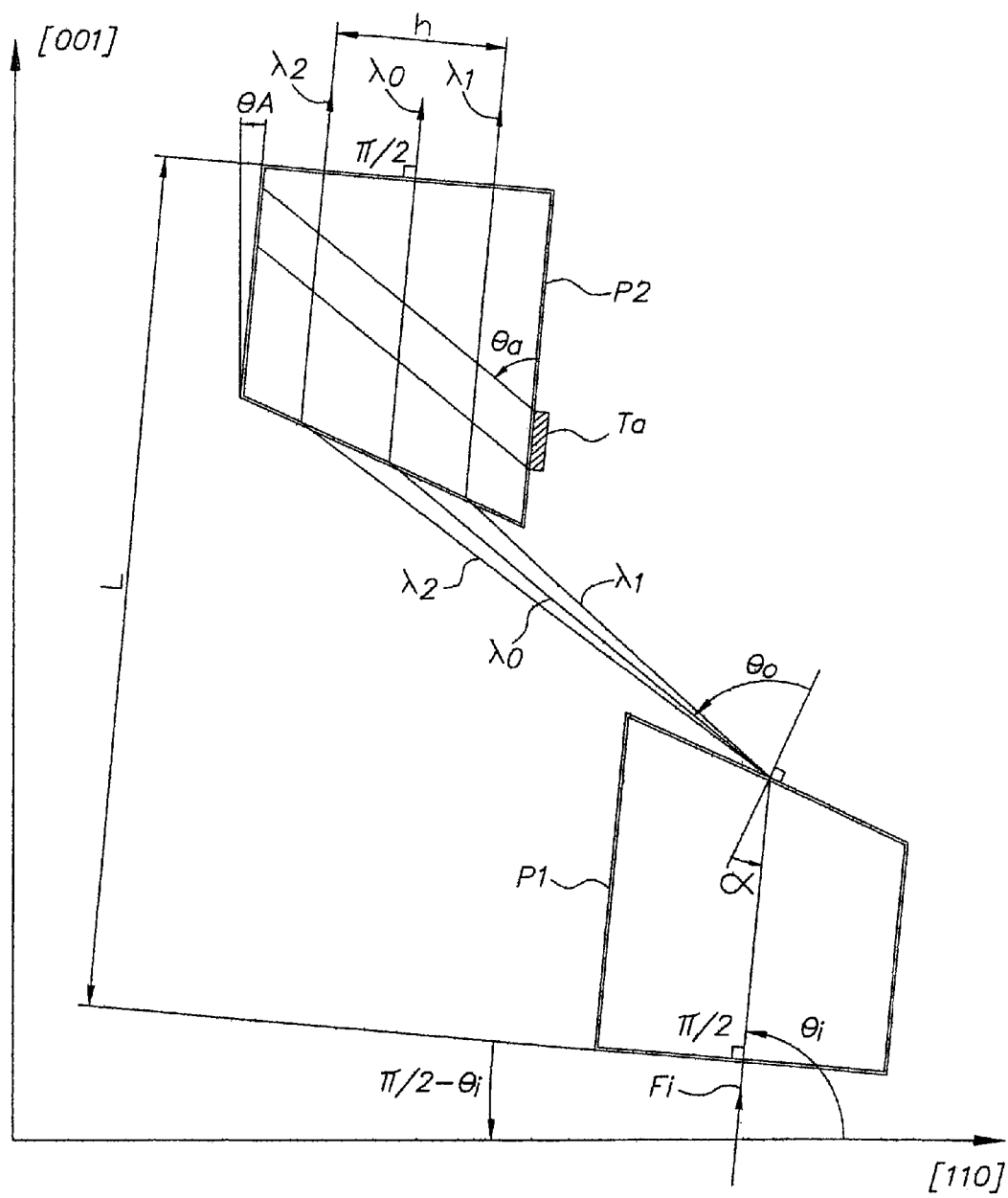
FIG. 2 is a diagrammatic representation of a device according to the invention.

In the example shown in FIG. 2, two truncated prisms $P_1$, $P_2$, with the same vertex angle α, are arranged head to tail, the input surface of said prism $P_1$ is parallel to the output surface of said prism $P_2$, the distance separating them being L; the output surface of said first prism $P_1$ is consequently parallel to the input surface of said prism $P_2$, the distance separating them being d; the distance between the vertices of the prisms $P_1$, $P_2$, defined perpendicularly to the distance L is equal to H.

An optical incident beam Fi is perpendicular to the input and output surfaces, respectively, of said prisms $P_1$, $P_2$; the polarisation of light is perpendicular to the edges of the prisms; the material constituting said prisms $P_1$, $P_2$, is a birefringent acousto-optic tellurium dioxide crystal $TeO_2$; the angle at the vertex of said prisms $P_1$, $P_2$, is such that the central wavelength of the light pulse bandwidth comes out of the output surface of the prism $P_1$ and enters the input surface of the prism $P_2$, under the Brewster angle.

Thus, in the vicinity of the output surface of the first prism $P_1$, the wavelengths, represented by the optical paths $\lambda_0$, $\lambda_1$, $\lambda_2$, are spatially separated from one another, so as to arrive at the input surface of the second prism $P_2$, which, after refraction in the second prism $P_2$, are mutually parallel and normal to the output surface of the second prism $P_2$.

If:

L is the distance separating the input and output surfaces, respectively, of prisms $P_1$, $P_2$, H is the distance between the vertices of said prisms $P_1$, $P_2$, defined perpendicularly to the distance L, α is the angle at the vertex of prisms $P_1$, $P_2$, θ is the diffraction angle between the prisms $P_1$, $P_2$, according to the wavelength, defined with respect to the normal to the output and input surfaces, respectively, of the prisms $P_1$, $P_2$, c is the speed of light, n is the extraordinary index of the tellurium dioxide crystal, and N ($N=n-\lambda \cdot dn/d\lambda$), is the extraordinary group index of the tellurium dioxide crystal, in the direction of the incident light rays, the delay time of group $t_R$ of the light between the input and output surfaces, respectively, of prisms $P_1$, $P_2$, is defined by the following equation:

$$\frac{ct_R}{L} = \frac{1}{G} \cdot \left[ \frac{1}{\cos\theta} + N \cdot (G - \cos\alpha - \sin\alpha \cdot \tan\theta) \right]$$

with:

$$\sin\theta = n \cdot \sin\alpha$$

$$\alpha + \theta_0 = \pi/2$$

$\theta_0$ being the diffraction angle, for the central wavelength $\lambda_0$, which satisfies the Brewster condition, i.e.:

$$\tan\theta_0 = n(\lambda_0), \text{ and}$$

G being a geometric parameter equal to the ratio of said distance L to said distance d, defined by the following equation:

$$G = \frac{L}{d} = \left( \cos\alpha - \frac{H}{L} \cdot \sin\alpha \right)^{-1}$$

In the example shown in FIG. 2, a piezoelectric transducer Ta, constituting the Bragg cell, is integrated with the base surface of the prism $P_2$, which base surface forms an angle $\theta_A$ of several degrees with the optical axis [001] of the tellurium dioxide crystal, i.e. 5 degrees, for example.

The acoustic height Δh is defined as being the distance that separates the optical paths of wavelength $\lambda_1$, $\lambda_2$, on each side of the central wavelength $\lambda_0$, in the second prism $P_2$.

Thus:

$\theta_A$ is the angle of the base of the prism $P_2$ with respect to the optical axis [001] of the crystal; $\theta_A$ is also the angle of the acoustic wavelength vector with the optical axis [110] of the crystal, $\theta_i$ is the angle of the incident beam Fi with respect to the optical axis [110] of the crystal, $\theta_0$ is the angle of the optical path of wavelength $\lambda_0$ with respect to the normal to the output surface of the first prism $P_1$, and $\theta_a$ is the angle of inclination of the acoustic energy beam with respect to the base of the second prism $P_2$.

Figure 3:
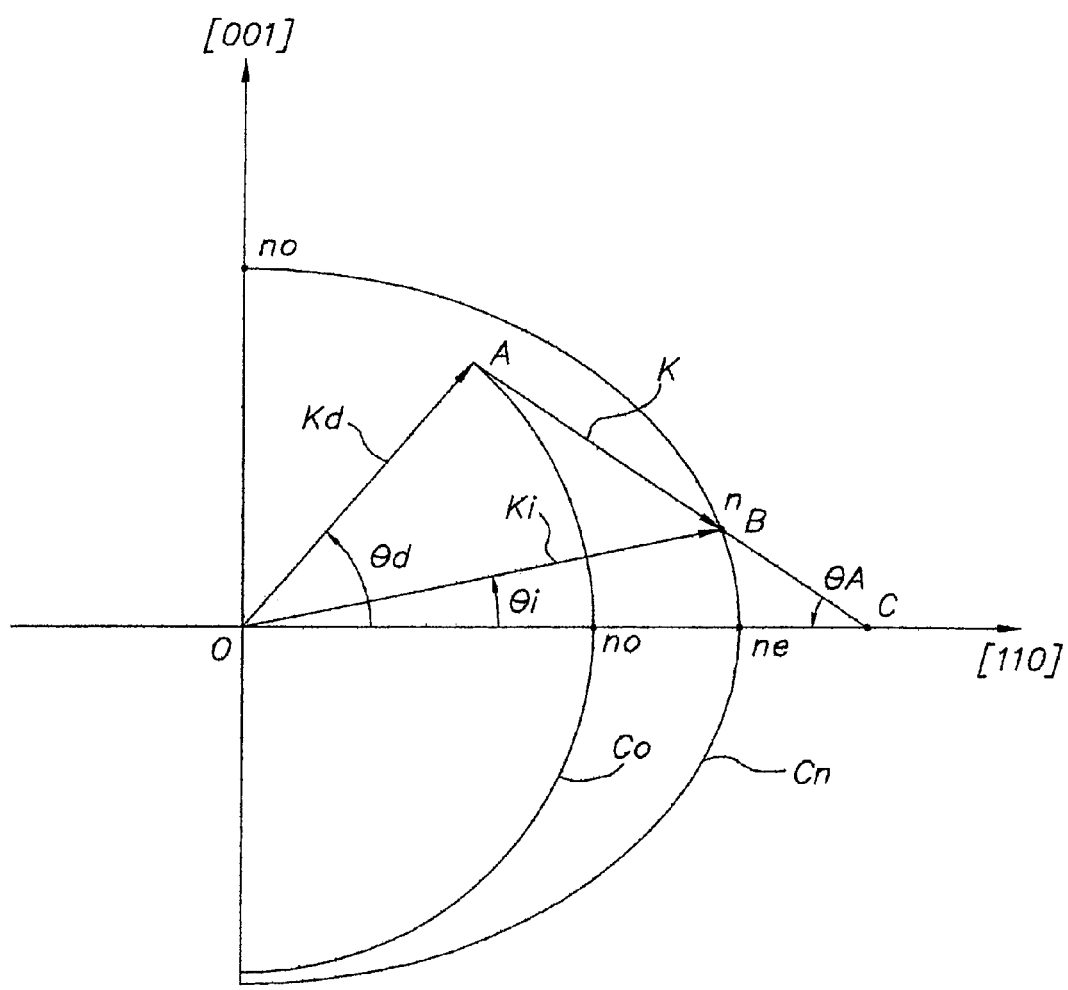
FIG. 3 is a representation of curves with an ordinary and an extraordinary index of the tellurium dioxide crystal ($TeO_2$) in the plane containing the optical axes [110] and [001]

In the example shown in FIG. 3:

the axis of abscissas is represented by the optical axis [110] of the tellurium dioxide crystal, the axis of ordinates is represented by the optical axis [001] of the tellurium dioxide crystal, the curve of ordinary index no is represented by the circle $C_O$ with centre O, the curve of extraordinary index n is represented by the ellipse $C_1$ of which the small axis, according to 001, corresponds to the radius $n_0$ of said circle $C_O$, and the large axis, according to 110, has the value $n_e$.

The deflection occurs from the extraordinary incident rays to ordinary diffracted rays in the plane containing the optical axes [001] and [110] of the tellurium dioxide crystal; for the central wavelength, the acoustic wave vector is approximately tangential to the ordinary index curve so as to provide the largest possible spectral band for the diffraction of extraordinary incident rays to ordinary rays, thus:

the optical incident wave vector $k_i$ is represented by the vector OB, the optical diffracted wave vector $k_d$ is represented by the vector OA, the acoustic wave vector K is represented by the vector AB, $\theta_i$ is the angle of the optical incident wave vector $k_i$ with respect to the optical axis [110], $\theta_d$ is the angle of the optical diffracted wave vector $k_d$ with respect to the optical axis [110], $\theta_A$ is the angle of the acoustic wave vector K with respect to the optical axis [110].

Under these conditions, the angle $\theta_i$ of the optical incident wave vector $k_i$ with respect to the optical axis [110], is associated with the angle $\theta_A$ of the base of the prism $P_2$ with respect to the optical axis [001], by the following equation:

$$\sin(\theta_i + \theta_A) = n_0(\lambda_0)/n(\lambda_0)$$

n is associated with the ordinary $n_0$ and extraordinary $n_e$ indices on the optical axis [110], by the following equation:

$$n = \frac{n_0 n_e}{\sqrt{n_0^2 \cos^2\theta_i + n_e^2 \sin^2\theta_i}}$$

and $n_0$ and $n_e$ are given as a function of the wavelength by the Sellmeier equations, namely:

$$n_0 = \sqrt{1 + \frac{2.5838\lambda^2}{\lambda^2 - 0.01801} + \frac{1.1566\lambda^2}{\lambda^2 - 0.06959}} \text{ and}$$

$$n_e = \sqrt{1 + \frac{2.8228\lambda^2}{\lambda^2 - 0.01801} + \frac{1.5416\lambda^2}{\lambda^2 - 0.06922}}$$

For example, if $\lambda_0$ is equal to 0.8 µm:
$n_0 = 2.226$,
$n_e = 2.373$, and
if $\theta_A$ is equal to 5°:
$\theta_i = 82.36°$,
$n = 2.229$,
$\theta_0 = 65.83°$,
$\alpha = 24.16°$,
$\theta_a = 49.43°$.

Figure 4:
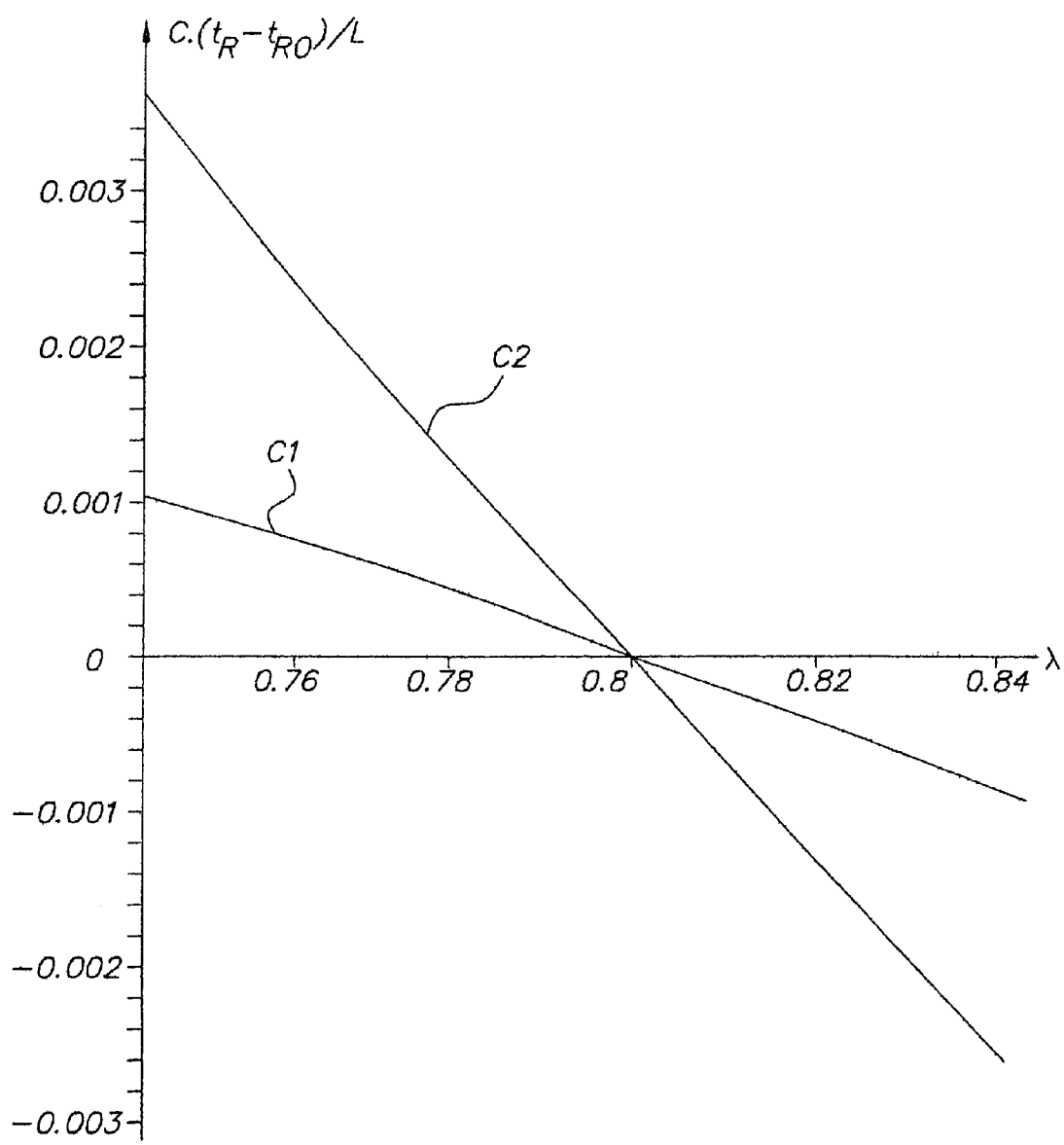
FIG. 4 is a representation of the characteristics of relative variation in the group delay time as a function of the optical wavelength.

In the example shown in FIG. 4, the characteristics of relative variation in the group delay time as a function of the optical wavelength are shown.

If $t_{R0}$ is the group delay time for the central wavelength $\lambda_0$ equal to 0.8 µm, the variation:

$$c \cdot (t_R - t_{R0})/L$$

is shown as a function of the optical length $\lambda$ for two values of H/L, L being the distance separating the input and output surfaces, respectively, of the prisms $P_1$, $P_2$, H being the distance between the vertices of said prisms $P_1$, $P_2$, defined perpendicularly to the distance L, namely:

the curves $C_1$, $C_2$, respectively for H/L=1.01 and for H/L=1.13.

The height $\Delta h$ of the acoustic column in the second prism $P_2$, as indicated above, is given around the central wavelength $\lambda_0$.

The difference $h-h_0$ is defined by the following equation:

$$\frac{h - h_0}{L} = \left(\cos\alpha - \frac{H}{L}\sin\alpha\right)\left[\frac{\sin(\theta - \alpha)}{\cos\theta} - \frac{\sin(\theta_0 - \alpha)}{\cos\theta_0}\right]$$

given that:
$\alpha$ is the angle at the vertex of prisms $P_1$, $P_2$,
$\theta_0$ is the angle of the optical path of wavelength $\lambda_0$ with respect to the normal to the output surface of the first prism $P_1$, and
$\theta$ is the angle of the optical path of wavelength $\lambda$ with respect to the normal to the output surface of the first prism $P_1$.

Figure 5:
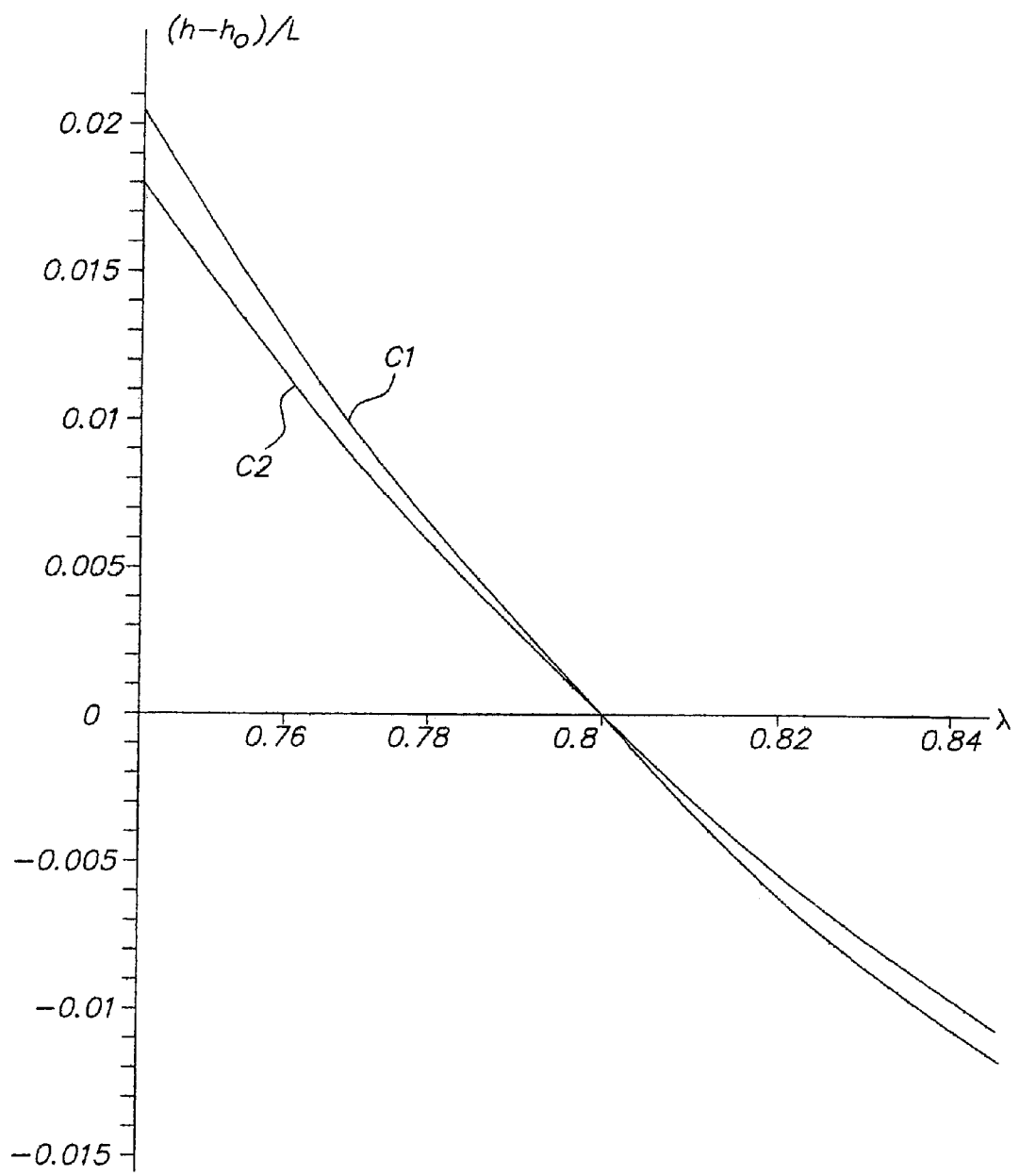
FIG. 5 is a representation of the characteristics of relative variation in the height of the acoustic column as a function of the optical wavelength.

In the example shown in FIG. 5, the characteristics of relative variation in the acoustic column height as a function of the optical wavelength are shown.

The variation:

$$(h - h_0)/L$$

is shown as a function of the optical wavelength $\lambda$ for two values of H/L, L being the distance separating the input and output surfaces, respectively, of the prisms $P_1$, $P_2$, H being the distance between the vertices of said prisms $P_1$, $P_2$, defined perpendicularly to the distance L, namely:

the curves $C_1$, $C_2$, respectively for H/L=1.01 and for H/L=1.13.

The total length l of the tellurium dioxide crystal passed through by light at the central wavelength $\lambda_0$ is given by the following equation:

$$\frac{l}{L} = \left(\frac{H}{L}\sin 2\alpha - \cos 2\alpha\right)$$

The frequencies to be applied to the piezoelectric transducer Ta are given by the following equation:

$$f = \sqrt{(615^2\cos^2\theta_A + 2100^2\sin^2\theta_A)} \cdot \sqrt{(n^2 - n^2)}/\lambda$$

Figure 6:
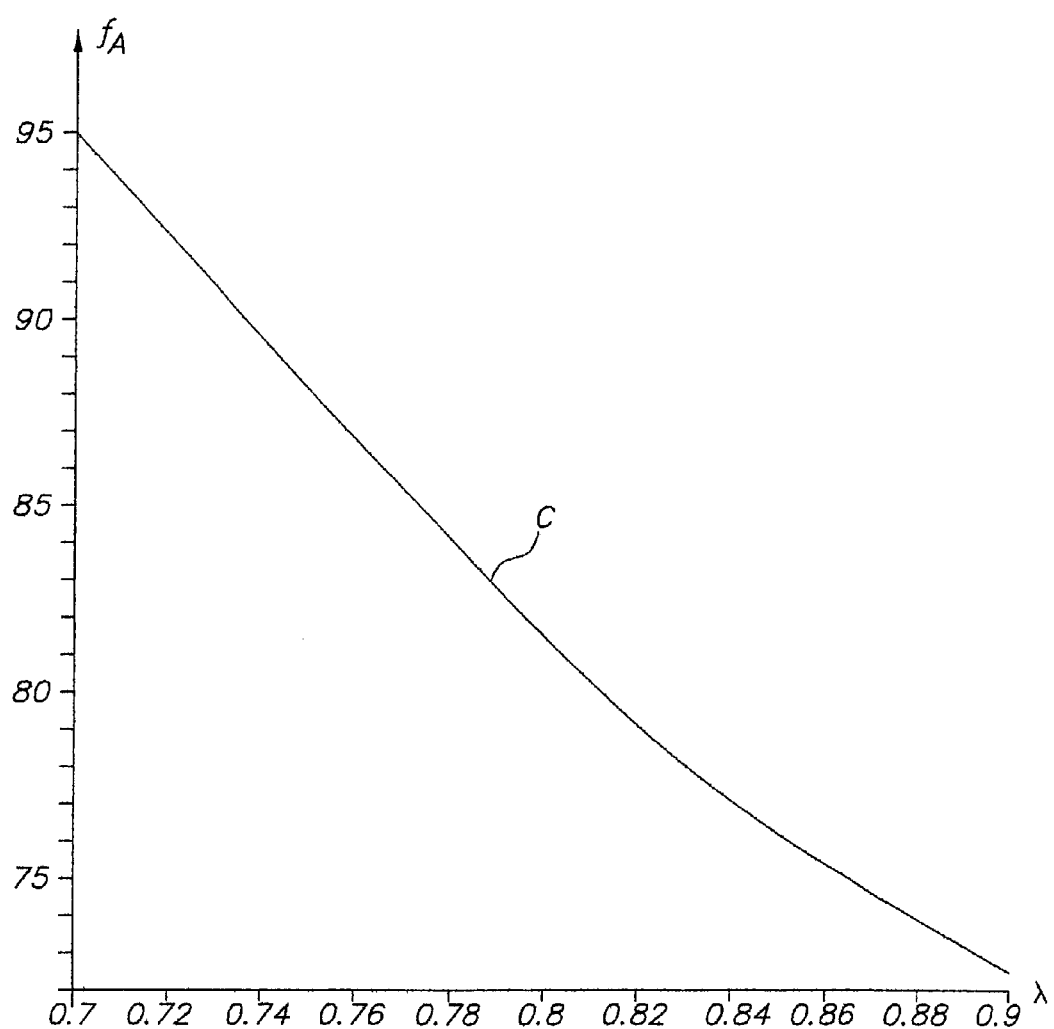
FIG. 6 is a representation of the characteristic of the acoustic frequency to be applied as a function of the optical wavelength.

In the example shown in FIG. 6, the characteristic of acoustic frequency $f_A$ to be applied as a function of the optical wavelength function $\lambda$ defined for $\theta_A$ is equal to 5 degrees (curve C).

For example, for an optical bandwidth of 100 nm, a length L of 56 cm, a height H of 56 cm,
the variation in the group delay time is 4.5 picoseconds,
the total length l of crystal passed through by light is 50 mm,
the area of the height $\Delta h$ of the acoustic column on which the wavelengths of the incident beam Fi are distributed is 20 mm, and
the frequency domain to be applied to the acoustic transducer is between 75 and 90 MHz.

Thus, the number of points for programming spectral amplitude of the device according to the invention, defined as being the ratio of the area of the height $\Delta h$ of the acoustic column on which the wavelengths are distributed, to the diameter of the incident beam Fi is, in this case, 20 points for an incident beam Fi diameter of 1 mm.

Advantageously, the amplitude and/or the frequency of the acoustic wave generated by said piezoelectric transducer Ta are programmed as a function of time; the signals applied to said piezoelectric transducer Ta are provided by a generator, associated with a computer that displays the desired frequency and amplitude parameters as a function of time.

The invention claimed is:

1. Device for dispersing light pulses of an optical beam, said device comprising first and second prisms each comprising an optical input surface which forms an optical output surface a vertex angle, the vertex angle of the first prism being equal to the vertex angle of the second prism, said first and second prisms being mounted head to tail, the optical input surface of the first prism being parallel to the optical output surface of the second prism and the optical output surface of the first prism being parallel to the optical input surface of the second prism, and being separated therefrom by a determined distance, said optical beam being applied to said optical input of the first prism surface at a determined incident angle to be diffracted by the first prism into a once diffracted optical beam which is applied to optical input surface of the second prism so as to obtain a twice diffracted optical beam generated at the output surface of said second prism, wherein at least one of said prisms is made of an acousto-optic material and is subjected to an acoustic beam providing from an acoustic transducer so as to generate in said acousto-optic material an integrated deflective Bragg cell having an axis which is substantially perpendicular to said optical beam so as to diffract the various wavelengths of said optical beam according to the characteristics of said acoustic beam, thus generating diffracted optical waves which are cancelled and undiffracted optical waves having for each wave-length an amplitude which is determined by the acousto-optic interaction between said optical beam and said acoustic beam.

2. Device according to claim 1, wherein the optical incident beam is perpendicular or almost perpendicular to the input and output surfaces, respectively, of said first and second prisms, and is polarised perpendicularly to the edges of said prisms.

3. Device according to claim 1, wherein the angle at the vertex of said first and second prisms is such that the light radiation of said optical beam corresponding to a wavelength at the centre of the spectrum, is under the Brewster incidence, relative to the output and input surfaces, respectively, of said first and second prisms.

4. Device according to claim 1, wherein the material constituting at least one of said first and second prisms is a tellurium dioxide crystal-type acousto-optic material of which the surface associated with a piezoelectric transducer forms an angle of less than 15 degrees with the optical axis of said tellurium dioxide crystal.

5. Device according to claim 1, wherein said piezoelectric transducer generates an acoustic wave of which the amplitude and/or the frequency are programmed as a function of time, the signals applied to said piezoelectric transducer being provided by a generator, associated with a computer that displays the desired frequency and amplitude parameters as a function of time.

* * * * *